United States Patent [19]

Neal

[11] 4,197,866

[45] Apr. 15, 1980

[54] SOIL MOISTURE SAMPLER AND CONTROLLER

[76] Inventor: Jerry D. Neal, Rte. 1, Box 129, Trinity, N.C. 27370

[21] Appl. No.: 834,778

[22] Filed: Sep. 19, 1977

[51] Int. Cl.² ............................................. A01G 25/16
[52] U.S. Cl. ........................................ 137/1; 73/75; 137/78 A; 239/63; 239/75; 324/65 R
[58] Field of Search ................. 137/78, 1; 239/63, 64, 239/75; 73/75; 340/602, 604

[56] References Cited

U.S. PATENT DOCUMENTS

| | | |
|---|---|---|
| 2,718,141 | 9/1955 | Richards .................................. 73/75 |
| 3,626,286 | 12/1971 | Rauchwerger .................... 239/63 X |
| 3,777,976 | 12/1973 | Milovancevic ......................... 137/78 |
| 3,847,351 | 11/1974 | Hasenbeck ............................. 239/63 |
| 3,882,383 | 5/1975 | Matlin .............................. 340/518 X |

OTHER PUBLICATIONS

Phene, C. J. et al. *Controlling Automated Irrigation with Soil Matric Potential Sensor*, Trans. Amer. Soc. Agr. Eng., vol. 16, No. 4, 773–776, 1973.
Phene, C. J. et al. *Measuring Soil Matric Potential in situ by Sensing Heat Dissipation Within a Porous Body: II. Experimenta Results*, Soil Sci. Amer. Proc., vol. 35, No. 2, Mar.–Apr., 1971.
Phene, C. J. et al. *Controlling Automated Irrigation with a Soil Matric Potential Sensor*, U.S. Salinity Laboratory, Riverside, Calif. (published prior to Jul., 1976).
Phene, C. J. et al. *Measuring Soil Matric Potential in situ by Sensing Heat Dissipation Within a Porous Body: I. Theory and Sensor Construction*, Soil Science Society of America Proceedings, vol. 35, No. 1, Jan.–Feb. 1971.
*Watertech Brochure*, 1976, 6 pages (Model 2002B on cover) Watertech, Trinity, N.C.
McCune–Neal Brochure for Matric Potential Sensor Probes 1001A, 1002A, 1971, High Point, N.C.
McCune–Neal Brochure for Matric Potential Measurement System 2002A, 1971, High Point, N.C.

*Primary Examiner*—Martin P. Schwadron
*Assistant Examiner*—Richard Gerard
*Attorney, Agent, or Firm*—Fay & Sharpe

[57] ABSTRACT

Periodically, the soil moisture sampler and controller automatically activates in-ground probe(s) to measure the soil moisture. The resulting output signal indicative of the soil moisture is adjusted for soil ambient temperature and compared to a pre-set soil moisture value. When the signal indicates that the soil moisture is less than a pre-set value, an irrigation timer is activated which causes the soil to be irrigated for a preselected time interval.

14 Claims, 2 Drawing Figures

SOIL MOISTURE SAMPLER AND CONTROLLER

BACKGROUND OF THE INVENTION

The invention relates generally to the field of automatic irrigation systems and more specifically, to irrigation systems which maintain the proper degree of soil moisture by measuring the soil moisture with in-ground probes and, when needed, activating irrigation sprinklers for a pre-set period of time.

There is a need for greater sophistication in the field of irrigation management. There are many factors which determine periodicity with which a field or an orchard needs water, such as temperature, wind conditions, humidity, and the maturity of the plants. Over the course of the growing season, the periodicity will, of course, change. With the greater stress on productivity of farming, it is essential to eliminate the damage caused to crops by over or under watering. Further, with many areas of the country experiencing water shortages, it is more necessary than ever to limit watering to only when it is actually needed.

In the past, there have been several methods for monitoring soil moisture, but none have been totally satisfactory. These methods are normally based on the measurement of physical properties related to the water content of the soil, most normally electrical properties. One of the most popular methods is based on measuring the electrical conductivity of the soil. But, electrical conductivity changes with other factors than moisture, such as the salinity of the soil. Further, the electrical current tends to degrade the electrodes by electrolysis and by chemical reaction with components within the soil, especially fertilizers.

The present invention measures the physical property of heat conductivity. It is based on the natural phenomenon that air is a good heat insulator, whereas water is a good conductor of heat. Similarly, when wet a porous element of the in-ground probe dissipates heat relatively quickly, whereas when the water has been replaced by air it dissipates heat relatively slowly. The porous element, being in physical contact with the soil, has virtually the same moisture content as the soil. By comparing the heat conductivity of the porous element to a given standard, one can tell the moisture content of the soil.

This invention fulfills the need for more sophisticated irrigation management equipment. It takes advantage of microelectronics to keep the price low, the speed with which measurements taken high, and the accuracy high. The system is relatively maintenance free and highly corrosion resistant. Further, the system is not effected by salinity, or other ionization conditions of the soil and under the environmental conditions of normal use would not be effected by freezing weather.

Among the advantages of the present invention is that it corrects automatically for temperature. Regardless of the temperature of the soil, the readings are still accurate.

Another advantage of the present invention is that it uses microelectronics which provide speed and accuracy at a relatively low price, freedom from maintenance, long life, and a relatively low amount of energy usage.

Another advantage of the invention is that it can be used to test the soil only at intermittent periods. This saves power because power can be supplied to the probe for a relatively short fixed period, spaced apart by relatively large intervals. This lengthens the life of the in-ground probe, reduces power consumption, and increases measurement accuracy.

Another advantage is that the invention is able to record moisture readings from many probes and control irrigation based on soil moisture tests on a plurality of regions in the field.

Another advantage is that the invention is amenable to solar/storage battery powered operation. For long periods, only a timer need be powered with intermittent short periods of greater power being drawn by the sensor probe's heating element.

Another advantage is that the invention makes checking soil moisture much simpler than in the past and removes the need for manual handling of equipment. This allows a large number of measurements at each of a large number of locations to be taken each day.

Another advantage is that the invention irrigates for an adjustable, preselected period of time. There is no need to activate the probes to control the irrigation shutoff. If the preselected interval should supply insufficient water, the irrigation period will be repeated after the next measurement cycle.

Another advantage is that the probes can be installed permanently in their under ground position because they are of such a long life, have such a freedom from maintenance, and are resistant to freezing.

BRIEF DESCRIPTION OF THE INVENTION

A timer periodically actuates the in-ground probe(s) to measure soil moisture. A first signal is generated by a probe at the beginning of actuation which is used as a temperature reference signal, and a second signal is generated by the probe at the end of the measurement. A temperature compensation circuit adjusts the second signal for the ambient temperature of the ground. The change in temperature is inversely proportional to the amount of moisture in the porous element of the probe, which moisture is proportional to the moisture in the soil. The resultant temperature corrected signal which varies inversely with the moisture level of the soil is then sent to a recording device and to a comparator. The recording device, such as a paper strip chart, makes a physical record of the moisture and the time of the reading. The comparator compares the output signal to a pre-set signal indicative of the minimum soil moisture thought desirable. If the comparator finds the soil drier then the pre-set minimum, then the comparator will send out a signal which activates a timer. The timer in turn controls a valve in the irrigation line. The timer will hold the valve open for a preselected period of time. A scanner enables the system to take moisture readings from a plurality of probes.

DESCRIPTION OF THE PREFERRED EMBODIMENT

Figure 1:
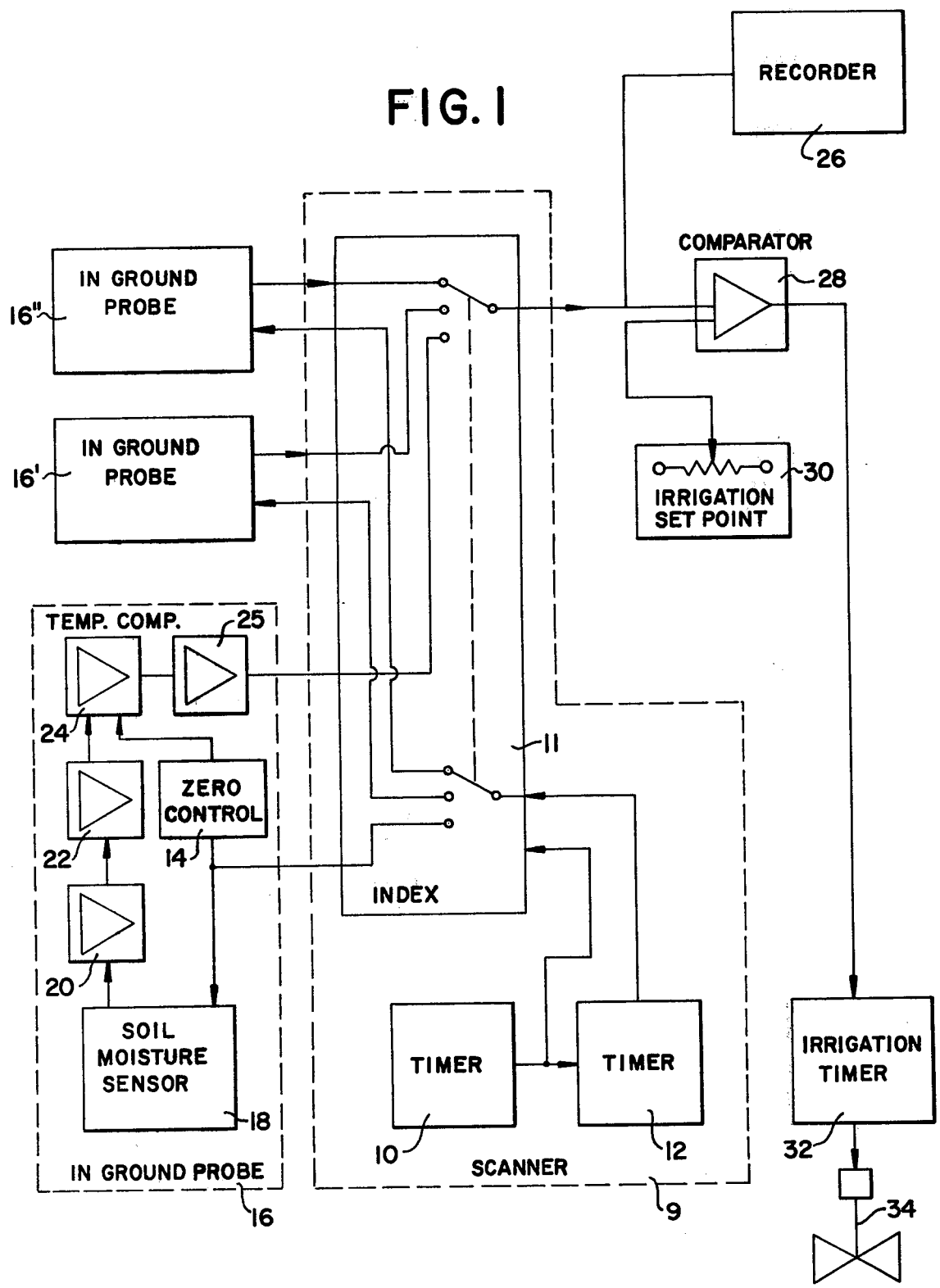
FIG. 1 is a block diagram illustrating the soil moisture sampler/controller system.

Referring first to FIG. 1, scanning means 9 controls the sampling of soil mositure at a plurality of test points determined by probes 16, 16', 16", buried in the ground at several points around the field or orchard. A sample rate timer 10, times the interval between actuations of the in-ground probes. The sample rate timer 10 may be adjustable, although a timed period of one-half hour between subsequent measurements at the same probe has been found to be very convenient, especially when the system is used with a means for permanently recording the moisture measurement. However, longer or shorter intervals may be used. Timer 10 periodically actuates a second timer 12 which is a sensor heater and temperature compensation circuit timer. Although timer 12 is illustrated as part of the scanner, it could also be located in the in-ground probe. Timer 12 through zero control circuit 14 actuates the temperature compensation circuit 24 and at the same time starts the actuation of the soil moisture testing in the in-ground probe 16. The first output signal from soil moisture sensor 18 which is indicative of the temperature of the probe is amplified by amplifiers 20 and 22 and stored by the temperature compensation circuit 24. At the same time, timer 12 actuates a heater in the soil moisture sensor 18 for a fixed period of time, for example 150 seconds. At the end of this fixed period, a signal indicative of its temperature is read by the temperature compensation circuit 24. The temperature increase in soil moisture sensor 18 is indicative of the moisture of the soil. The more moist the soil, the greater the rate at which the heat is dissipated from the heating element. Thus, the more moist the soil, the less the temperature of soil moisture sensor 18 will increase during the fixed heating period. Temperature compensation circuit 24 then subtracts the first temperature from the second temperature to give the net temperature increase for the given period. Circuit 24 produces a voltage analog signal indicative of net temperature increase which also indicates the moisture of the soil. Optional amplifier 25 calibrates the output temperature compensation 24 to a convenient amplitude. For example, the output voltage amplifier 25 in volts equals the soil moisture tested in bars—1 volt equals 1 bar, $\frac{1}{2}$ volt equals $\frac{1}{2}$ bar, etc.

Index circuit 11 selects the probe to be used. The signals may be selectively transmitted through index circuit by using a multiposition relay, or by using solid state gate elements in conjunction with a stepping register or counter which is stepped by timer 10 or timer 12 or a clock pulse generator or by the actuation of the preceding gate element, or using any one of the many circuitry combinations which are readily apparent. The index circuit 11 connects the output of timer 12 to one or more of the in-ground probes 16 and the output of a selected probe to the recorder and comparator circuit. The index circuit can be used so that timer 12 sequentially actuates one probe at a time with that probe's output being connected to the recorder and comparator. Other actuation orders are readily apparent, for example, timer 12 can actuate the heater elements of all in-ground probes simultaneously and sample the probe outputs in rapid succession.

Further, timer 10 may be eliminated in some modes of operation. For example, if timer 12 actuates each heater coil for 150 seconds and if one wishes to sample each of twenty probes once every 30 minutes, then timer 12 and index circuit 11 can be set up to sample the probes sequentially each immediately upon the termination of sampling the preceding probe.

The output signal from each probe goes via the index circuit to both a soil moisture recorder 26 and comparator 28. The soil moisture recorder may be a strip chart recorder, such as the Watertech 1500. Comparator 28 compares the voltage analog signal from the temperature compensation circuit 24, with the voltage from an irrigation set point circuit 30. If the signal indicates that the soil is drier than that set on the irrigation set point circuit 30, comparator 28 sends a digital signal pulse to irrigation timer 32. Irrigation timer 32, in the preferred embodiment, is a digitally programmed timing device. In some instances, irrigation periods up to 10 hours have been found desirable, but normally shorter periods of 0 to 4 hours used.

Digital timer 32 operates solenoid valve 34 in the irrigation line. Timer 32 holds solenoid valve 34 open for the fixed preselected period of time. Alternately, a two state valve can be used so that a first pulse from timer 32 puts valve 34 in its open state and later pulse returns the valve to its closed state.

Alternately, the output signal from comparator 28 to timer 32 can also be gated through scanner 9 so that 2 or more irrigation line control valves similar to 34 can be controlled by the system. Although there could be one or more control valves for each probe, more normally there are many more probes than control valves.

Figure 2:
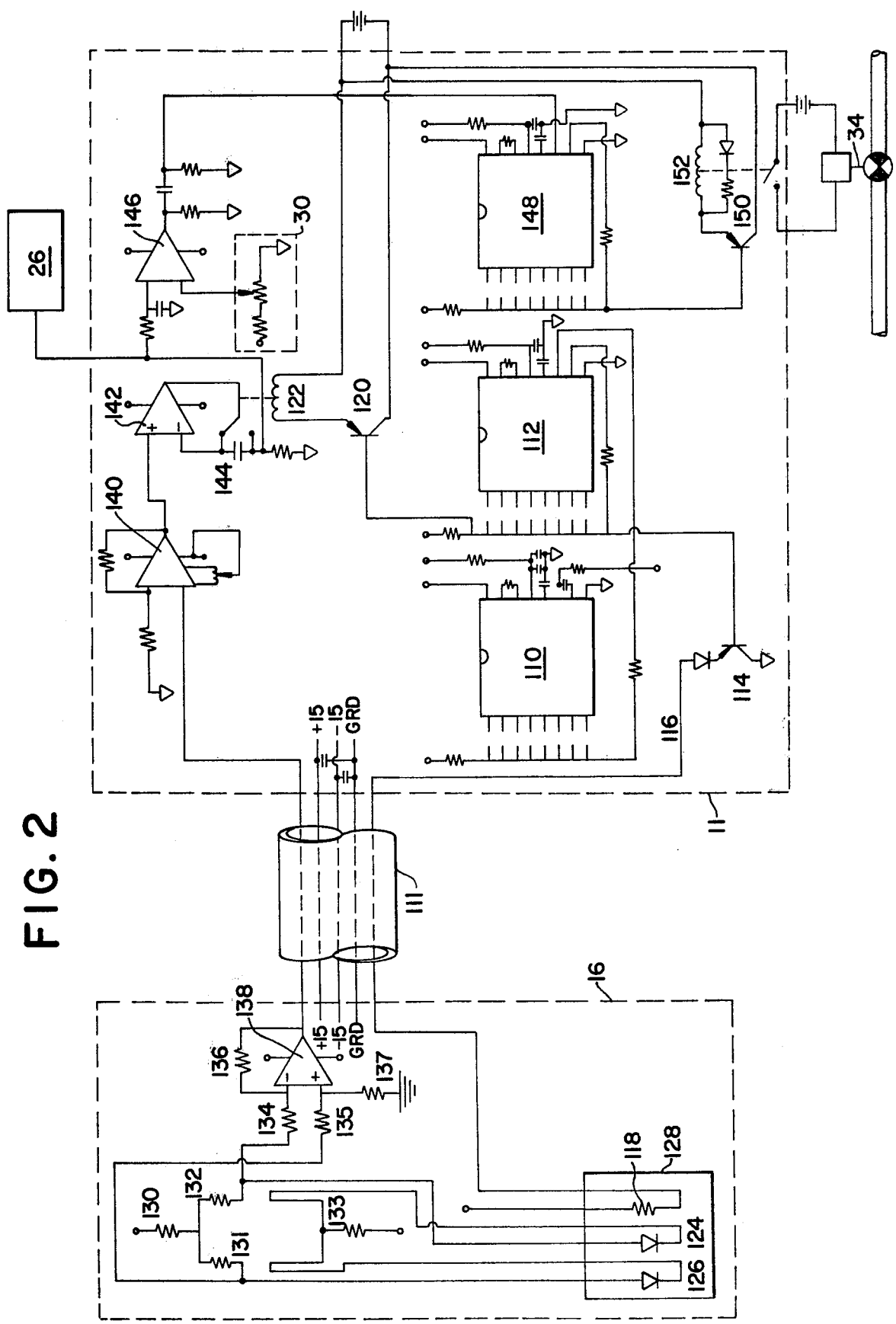
FIG. 2 is a schematic diagram illustrating a second embodiment of the sampler/controller system with the circuitry in more detail.

FIG. 2 describes a similar system in more detail. For simplicity, only one in-ground probe is illustrated, but this system can be adapted to handle several probes by merely adding an indexing circuit as shown in FIG. 1. A sample rate timer 110 is the basic timing unit for control unit 11. Base timer 110 can be set to provide an output pulse periodically, for example every half hour, to initiate the operation of a measurement cycle. The output pulse from timer 110 is connected to the input of a timing means 112. When timer 112 is actuated, it sends out a signal which puts transistors 114 and 120 in their conductive states. Transistor 114, when actuated by timer 112, allows current to flow through heater control line 116. Current flowing through this line flows through in-ground conduit 111 to resistance heater 118 of the in-ground probe 16.

The same output from timer 112 also turns on transistor 120, which in turn activates relay 122. These two transistors 114 and 120 and their associated systems stay actuated for the period of time fixed by the second timer, for example 150 seconds.

In-ground probe 16 can be the matric potential sensor probe 1001A or 1002A made by Watertech of High Point, North Carolina. The probe includes a sensing means, such as diodes 124 and 126 along with energy supplying means such as a resistance heater 118 are encapsulated in transfer means such as a small porous ceramic rod 128. The sensing means senses the energy level temperature, of the transfer means at least before and after the energy supplying means supplies a known quantum of energy to the transfer means. Rod 128, being porous, absorbs water from the soil and has a moisture content proportional to that of the surrounding soil. Diode 126 compensates the sensor for ambient soil temperature changes while diode 124 measures the temperature rise at the center of the ceramic rod when electric current is passed through resistance heater 118. The temperature rise that takes place is inverse to the moisture content inside the ceramic rod. The greater the moisture within the ceramic rod the greater is the amount of heat absorbed by the water and the smaller is the temperature rise. The temperature is measured by diode 124 and diode 126 by the change in forward voltage drop with respect to temperature for a silicon diode. For the diodes used in Watertech probes 1001A and 1002A, this change will be approximately 2.2 millivolts per degree centigrade. Resistors 130–133 form with the diodes the basic elements of a Wheatstone bridge. Resistors 131 and 132 balance the current through diodes 124 and 126, allowing, in the preferred embodiment, approximately one milliamp of current to flow through each diode. Resistors 134–137 form the feedback components necessary to set the gain of amplifier 138, for example to a gain of 100. The amplifier 138 is connected with rod 128 for under ground installation to take advantage of the slow temperature changes under ground when the unit is installed at depths greater than six inches. Diodes 124 and 126 must be matched for proper temperature tracking capability. Also, the initial forward voltage drop of diodes 124 and 126 must match in order to prevent saturation of amplifier 138.

The output signal of amplifier 138 in analog voltage form is fed to amplifier 140 where it is amplified a second time, e.g. another 10 times. From there, the voltage signal goes to a differential amplifier 142 and on into storage means 144. Storage means 144 may be, for example, a 0.68 MFD capacitor. When timer 112 actuates transistor 120 and relay 122, the voltage across capacitor 144 is isolated. The voltage stored in capacitor 144, representative of the ambient temperature, provides one input into differential amplifier 142. As timer 122 acts to cause resistance heater 118 to heat the sensor probe, the voltage output of amplifier 138 and 140 similarly changes. The differential amplifier 142 acts as a combining means for subtractively combining the signal from the probe with the signal from the storage means to form an adjusted signal which is the difference between the voltage input from amplifier 140 and the voltage stored in the capacitor 144. The voltage representative of the difference between the starting and finishing voltages, i.e., temperature, of the diode 124 in the sensor probe is fed to a comparing means 146 and to recorder 26. Amplifier 140, differential amplifier 142, and storage capacitor 144 may, optionally, be built into the in-ground probe 16.

Comparator 146 compares a reference signal from differential amplifier 142 with the voltage from an adjustable set point control 30. The voltage of set point control 30 may be produced by using a variable resistor as a voltage divider. The comparator converts the signal from an analog to a digital signal. If the voltage from circuit 142 exceeds the voltage from set point control 30, then comparator 146 provides an output pulse to digital timer 148. Digital timer 148 may be programed with an eight bit mini dip switch. For example, the time may be programmable from 55 seconds to 14,025 seconds. Timer 148 acts to bias transistor 150 into its conducting mode for the pre-set period of time. Transistor 150 controls a relay 152, which in turn controls the solenoid valve 34 in the irrigation line. Relay 152 may control irrigation in other ways such as controlling a water pump.

As indicated above, multiple probes and a scanner can be incorporated into the embodiment of FIG. 2. Further indicated above, this scanner could gate the output signals of comparator 146 to a plurality of irrigation control means in FIG. 2. Further, the scanner could program timer 148 for different times for different probes and/or irrigation lines. The correspondence of probes to irrigation lines will, of course, be dictated by the physical arrangement of the irrigation lines and placement of the probes.

It is understood that the above detailed description is by way of illustration only and is not intended to restrict the invention as claimed below to any particular form where equivalent implementations exist to carry out the recited function. All variations within the range of equivalents are intended to be embraced by the claims which follow.

I claim:

1. A moisture sampling and controlling apparatus comprising
    at least one probe comprising a transfer means for transferring energy at a rate determined by its moisture content, energy sensing means for sensing the energy level of at least a part of said transfer means, energy supplying means for supplying energy to said transfer means, said sensing means producing a signal indicative of the sensed energy level;
    timing means for actuating said energy supplying means to cause said energy supplying means to supply a preselected quantum of energy to said transfer means, said timing means operatively connected with said energy supplying means;
    storage means for storing a signal from said sensing means before said energy supplying means supplies said preselected quantum of energy to said transfer means, said storage means operatively connected with said sensing means;
    means for combining the stored signal with a signal from said sensing means when said energy supplying means has supplied said preselected quantum of energy to said transfer means thereby producing an adjusted signal, said combining means being operatively connected with said storage means and said sensing means;
    comparing means for comparing the adjusted signal with a selectable reference, said comparing means operatively connected with said combining means; and
    means for controlling the flow of an irrigating fluid, said flow control means operatively connected with said comparing means.

2. The soil moisture sampling and controlling apparatus as set forth in claim 1 wherein said energy transfer means includes a porous element adapted for placement in such connection with the soil that moisture can be drawn from the soil to the porous element whereby moisture level of the porous element is related to the effort required of plants to withdraw moisture from the soil.

3. The soil moisture sampling and controlling apparatus as set forth in claim 2, wherein said energy supplying means is a heating means for supplying heat for a selected period determined by said timing means, and wherein said sensing means senses the temperature of at least part of said porous element.

4. The soil moisture sampling and controlling apparatus as set forth in claim 3, wherein said sensing means includes a diode whose electric properties vary with temperature.

5. The soil moisture sampling and controlling apparatus as set forth in claim 3, further including a sample rate timer for timing a sampling interval between subsequent soil moisture samplings, said sample rate timer operatively connected with said timing means for periodically causing said timing means to begin said selected period.

6. The soil moisture sampling and controlling means as set forth in claim 1, wherein said combining means is a subtraction means for substantively combining the stored signal and the signal from the sensing means whereby the adjusted signal is indicative of the difference in the energy level of the at least a part of said transfer means caused by the quantum of energy from said energy supplying means.

7. The soil moisture sampling and controlling apparatus as set forth in claim 6, wherein said storage means and said subtraction means are mounted within said probe for subterranean placement.

8. The soil moisture sampling and controlling apparatus as set forth in claim 1, further including means operatively connected with said combining means for converting said adjusted signal to a visual display of soil moisture.

9. A soil moisture sampling and controlling apparatus comprising:
- a soil moisture sampling probe adapted for totally subterranean placement, said probe including a temperature sensing means for sensing the temperature of at least a part of the probe and a heating means for heating at least a part of the probe, said sensing means producing a signal indicative of the temperature of at least a part of said sensing means;
- storage means for storing at least one of said temperature indicating signals;
- said storage means operatively connected with said sensing means;
- timing means for actuating said heating means for a selected period and for causing said storage means to store a signal whereby the storage means stores the signal indicative of the temperature of the sensing means substantially at the beginning of the selected period, said timing means operatively connected with said heating means and said storage means;
- means for subtractively combining the stored signal in said storage means with the signal from said sensing means to produce an adjusted signal, said subtractive combining means operatively connected with said sensing means and said storage means;
- comparator means for comparing said adjusted signal with a reference signal, said comparator means operatively connected with said subtraction means; and
- means for controlling a flow of fluid, said flow controlling means operatively connected with said comparator means.

10. A soil moisture sampling and controlling system comprising:
- a plurality of soil moisture sensing probes adapted for subterranean placement, each probe including a heat transfer means for transferring heat at a rate determined by its moisture level, temperature sensing means positioned to sense the temperature of at least a part of said heat transferring means, and heating means positioned to heat at least a part of said heat transferring means, each said sensing means producing a signal indicative of the temperature of said each sensing means;
- indexing means operatively connected to said plurality of probes for indexing said probes sequentially in groups of at least one probe;
- storage means operatively connected with said indexing means for storing the signals from the sensing means of each indexed probe;
- timing means operatively connected with said indexing means and said storage means, said timing means actuating each indexed heating means for a selected period and causing said storage means to store the signal from each indexed sensing means generally at the beginning of said selected period;
- subtraction means operatively connected with said indexing means and said storage means, said subtraction means subtractively combining the stored signal from each sensing means with the signal from the same sensing means to produce an adjusted signal;
- comparator means for comparing each said adjusted signal with a reference, said comparator means operatively connected with said subtraction means;
- control means adapted to provide a flow of irrigating fluid, said control means operatively connected with said comparator.

11. The soil moisture sampling and controlling apparatus as set forth in claim 10, further including a sampling rate timing means for periodically stepping said indexing means to index another group of at least one probe and for periodically causing said timing means to begin said selected period.

12. The soil moisture sampling and controlling apparatus as set forth in claim 10, wherein said heat transfer means is a porous element which dissipates heat more rapidly at higher moisture levels than at lower moisture levels.

13. The method of sampling and controlling moisture in soil comprising:
- determining an energy characteristic of at least a first part of a moisture absorptive energy transfer means, said energy transfer means being positioned in moisture communication with the soil whereby the moisture content of the transfer means is indicative of moisture availability from the soil;
- electronically storing the first determination;
- supplying at least a second part of the energy transfer means with a quantum of energy;
- automatically determining the energy characteristic of the at least first part of the energy transfer means when the quantum of energy has been supplied;
- electronically combining the stored determination and the second determination to ascertain the variation in the energy characteristic from the quantum of energy;
- electronically comparing the variation with a reference moisture level to determine if the reference moisture level is met; and
- providing for the flow of irrigating fluid to the soil when the reference moisture level is not met.

14. The method as set forth in claim 13, wherein said energy characteristic is temperature and said energy is heat, whereby the variation in temperature is indicative of energy transfer properties of the energy transfer means.

* * * * *

UNITED STATES PATENT AND TRADEMARK OFFICE
CERTIFICATE OF CORRECTION

PATENT NO. : 4,197,866
DATED : April 15, 1980
INVENTOR(S) : Jerry D. Neal

It is certified that error appears in the above—identified patent and that said Letters Patent is hereby corrected as shown below:

In the patent heading, the following patent assignment data is added following the line identified as [76] Inventor:

Assignee:  Moisture Control Systems, Incorporated
                   Findlay, Ohio Signed and Sealed this First Day of July 1980

[SEAL]

Attest:

SIDNEY A. DIAMOND

Attesting Officer    Commissioner of Patents and Trademarks